(12) United States Patent
Bergeron

(10) Patent No.: US 6,926,314 B2
(45) Date of Patent: Aug. 9, 2005

(54) MUDGUARD GRITTER

(76) Inventor: Rock Bergeron, 610 Boul St-Joseph, Québec (CA), G2K 1W5

( * ) Notice: Subject to any disclaimer, the term of this patent is extended or adjusted under 35 U.S.C. 154(b) by 0 days.

(21) Appl. No.: 10/195,167

(22) Filed: Jul. 16, 2002

(65) Prior Publication Data

US 2003/0020283 A1 Jan. 30, 2003

(51) Int. Cl.⁷ ............................................. B61C 15/00
(52) U.S. Cl. .......................... 291/39; 291/38; 291/25; 291/28; 291/35
(58) Field of Search .............................. 291/38, 39, 40, 291/25, 32, 28, 30, 36, 35; 222/196, 198, 199, 200, 226, 243, 227

(56) References Cited

U.S. PATENT DOCUMENTS

| | | | | |
|---|---|---|---|---|
| 345,768 A | * | 7/1886 | Cammann ..................... | 291/34 |
| 488,387 A | * | 12/1892 | Crory ........................... | 291/28 |
| 1,380,964 A | * | 6/1921 | Hopkins ........................ | 291/3 |
| 1,810,765 A | * | 6/1931 | Herdling ....................... | 291/39 |
| 1,812,952 A | * | 7/1931 | Herdling ...................... | 291/32 |
| 1,877,475 A | * | 9/1932 | Cowan ......................... | 291/19 |
| 2,207,169 A | * | 7/1940 | Todd .............................. | 291/3 |
| 3,271,061 A | * | 9/1966 | Miller .......................... | 291/14 |
| 3,774,945 A | * | 11/1973 | Lee et al. ..................... | 291/38 |

* cited by examiner

Primary Examiner—Mark T. Le

(57) ABSTRACT

A mudguard gritter that can be easily installed on trucks, school buses, delivery trucks and semitrailers. It can be fixed to supports of existing mudguards. The mudguard gritter comprises a container forming a hopper having the shape of a conventional aileron, with a top rectangular opening of 150 mm per 600 mm and a bottom opening of 25 mm per 600 mm. The top site has a door with hinges that make it possible to fill up the container with fine gravel. A rake supports eccentric vertical stems, which meet through an intermediate guide, at the bottom, on a mobile plate driven by a dual action cylinder powered by compressed air passing through a valve whose control is on the dashboard of the vehicle.

11 Claims, 6 Drawing Sheets

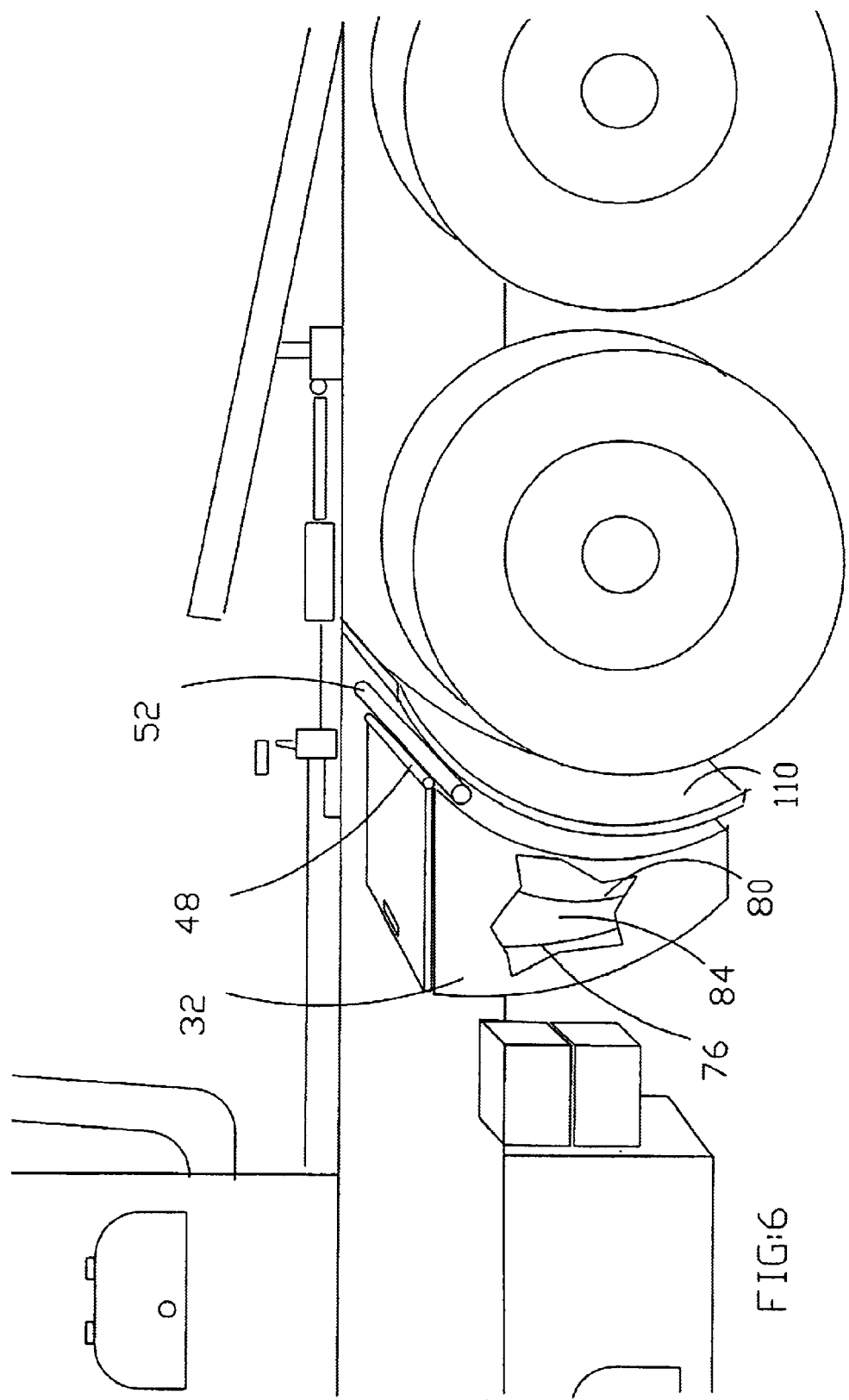

MUDGUARD GRITTER

BACKGROUND OF THE INVENTION

1. Field of the Invention

This invention relates to the field of devices that release sand or other abrasive material to improve traction when a vehicle, truck or car, ride on slippery roads. It also applies to tractors moving on slippery grounds or any other vehicle equipped with certain types of tires.

2. Description of the Prior Art

Certain patents particularly drew our attention:

SU 1770188, Lugan, Oct. 23, 1992, shows a gritter equipped with a pipe heated by capacitors that shake sand in a hopper.

U.S. Pat. No. 2,529,197, Storberg, Nov. 7, 1950 is a hopper filled with sand. It comprises a vibrator that provokes the discharge of sand.

U.S. Pat. No. 4,852,949, Quinn, the Aug. 1, 1989, of shows a funnel-like container located near the front wheels of a vehicle. Balls are ejected with a button. An indicator light indicates the absence of balls. These balls are between ¼ and ½ inch in diameter.

OBJECTS OF THE INVENTION

It is a general objective of the invention to provide a hopper for abrasive gravel that is easy to install on a vehicle. Gravel is spread inside so it will not agglutinate when frozen.

Another objective is to provide a bin of the shape of a mudguard that follows the shape of a tire. This bin can be fixed onto the support of an existing mudguard. The bin has a capacity of approximately 25 kg. Vertical rods are fixed on a stirring frame driven by a dual cylinder controlled by a lever located inside the vehicle.

BRIEF DESCRIPTION OF THE DRAWINGS

The present invention will be further understood from the following description with reference to the drawings in which:

FIG. 6 is a perspective with a window that shows the interior.

DETAILED DESCRIPTION OF THE PREFERRED EMBODIMENT

Figure 1:
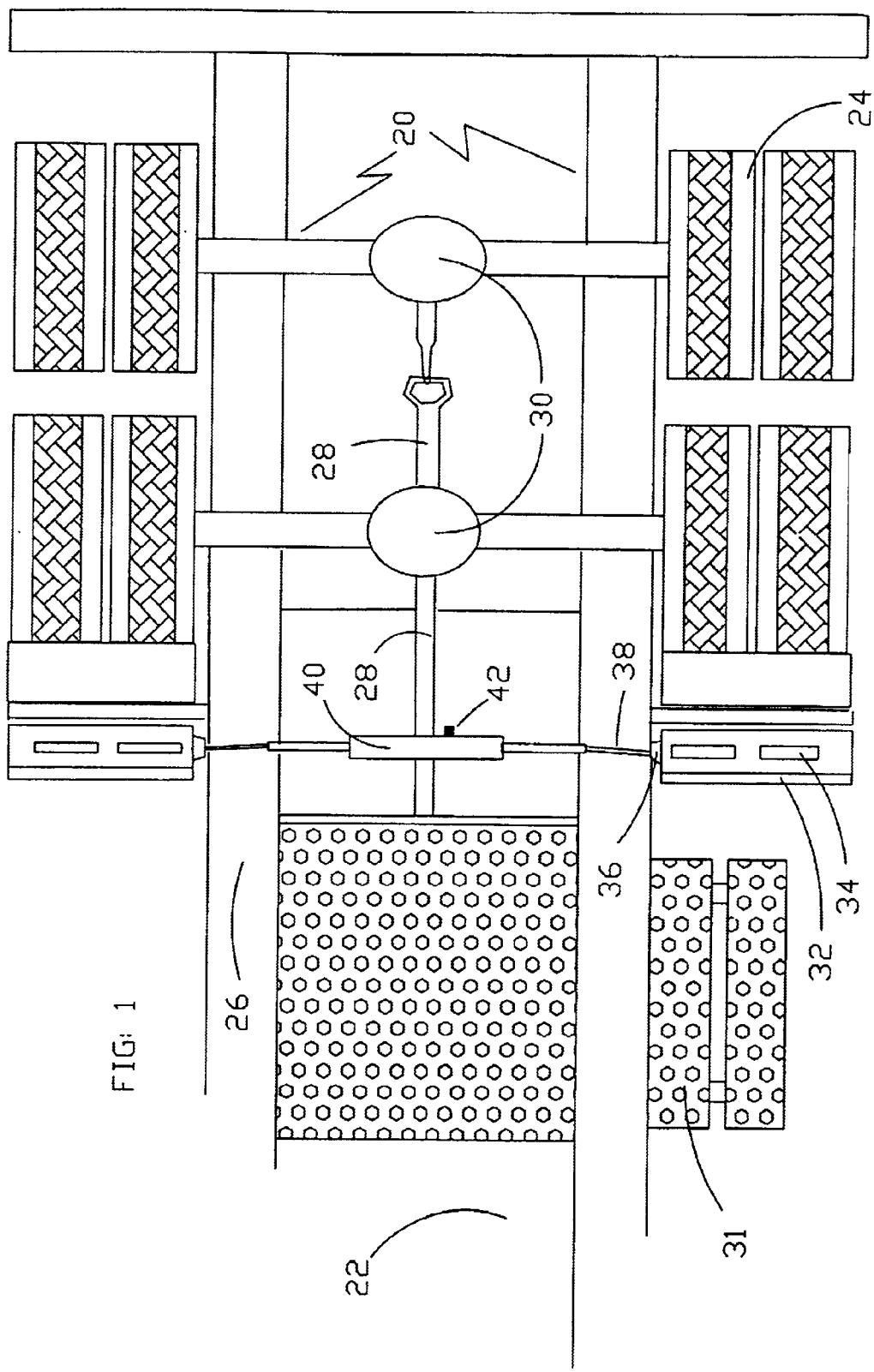
FIG. 1 is a bottom view of a mudguard near the aft wheels of a tractor.

An embodiment of the invention is illustrated-in the drawings wherein the same numbers identify the same characterizing elements.

FIG.1 shows the underside of a truck 20 between a cabin 22 and rear wheels 24. There is a frame 26, made of two stringers located on both sides of a driving shaft 28. The driving shaft is located near two differentials 30. One sees the outer limits of a gravel bin 32 used as a mudguard gritter. Traps 34, with elongated rectangular shapes, are located beneath the gravel bin, just in front of the first pair of wheels. A trap rod 36 pushes onto the first of the traps 34. A thrust rod 38 leans on the trap rod 36 and is propelled by a dual cylinder 40. An air intake 42 provides a dual cylinder 40 with air.

Figure 2:
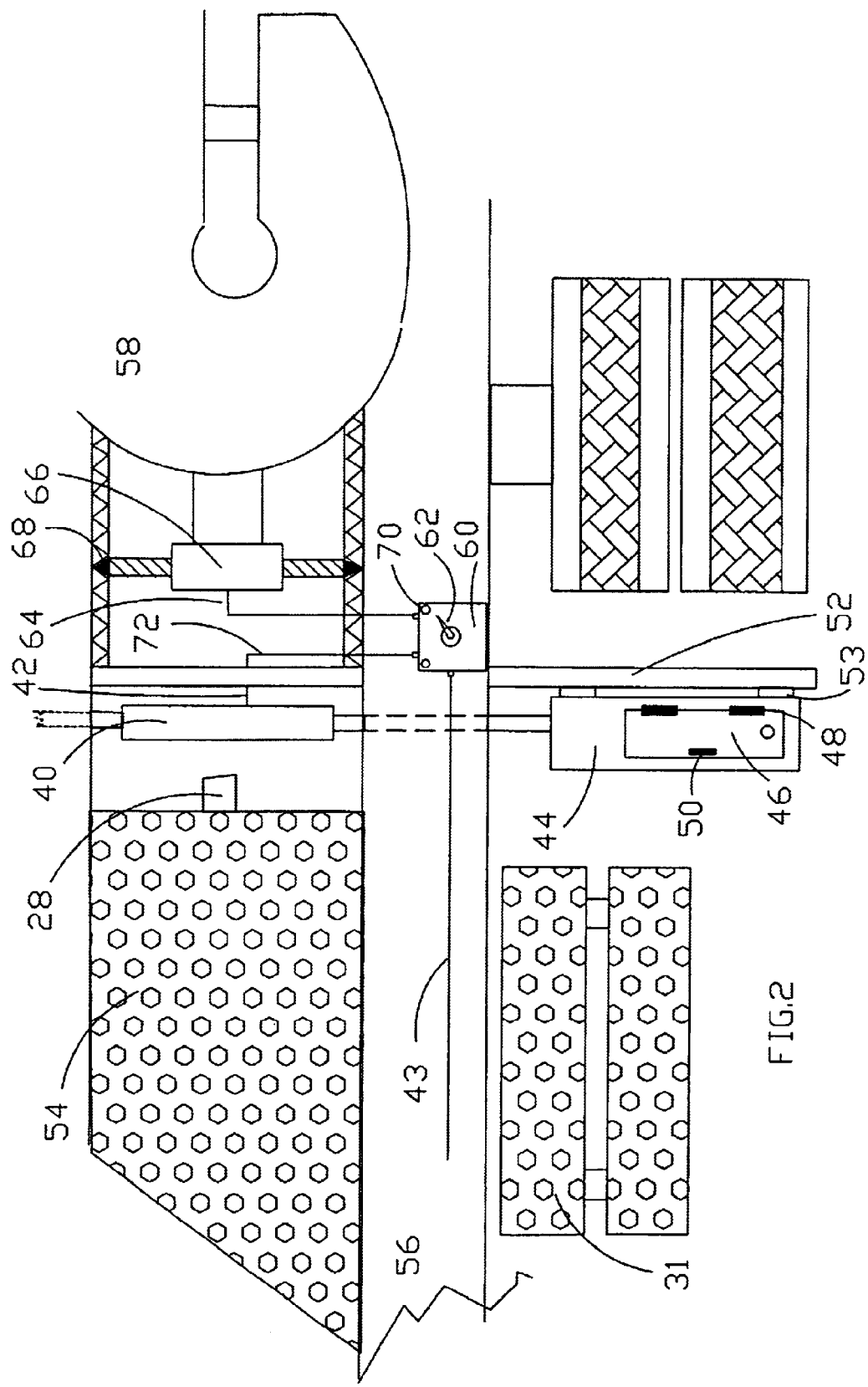
FIG. 2 is a top view of the mudguard of FIG. 1.

FIG. 2 shows an air conduit 43 coming from the cabin. A hopper 44 has a top gate 46, with two hinges 48 and a locking handle 50. The top gate 46 opens backward so it remains opened even if the front of a trailer overlaps a position, as far as a central platform 54 or as far as a front 56. A bolster 58 indicates the type of vehicle and where the front is located. A valve 60 is attached to the air conduit 43 and deflects the air in accordance with the position of a position indicator 62 either through a terminal 70 towards a bolster air line 64 or towards a feeding line 72 to the dual cylinder 40. The bolster air line 64 feeds a bolster cylinder 66 and one bolster jaw 68. The feeding line 72 passes by the air intake 42 to feed the dual cylinder 40 then returns towards the centre under the pressure of springs.

Figure 3:
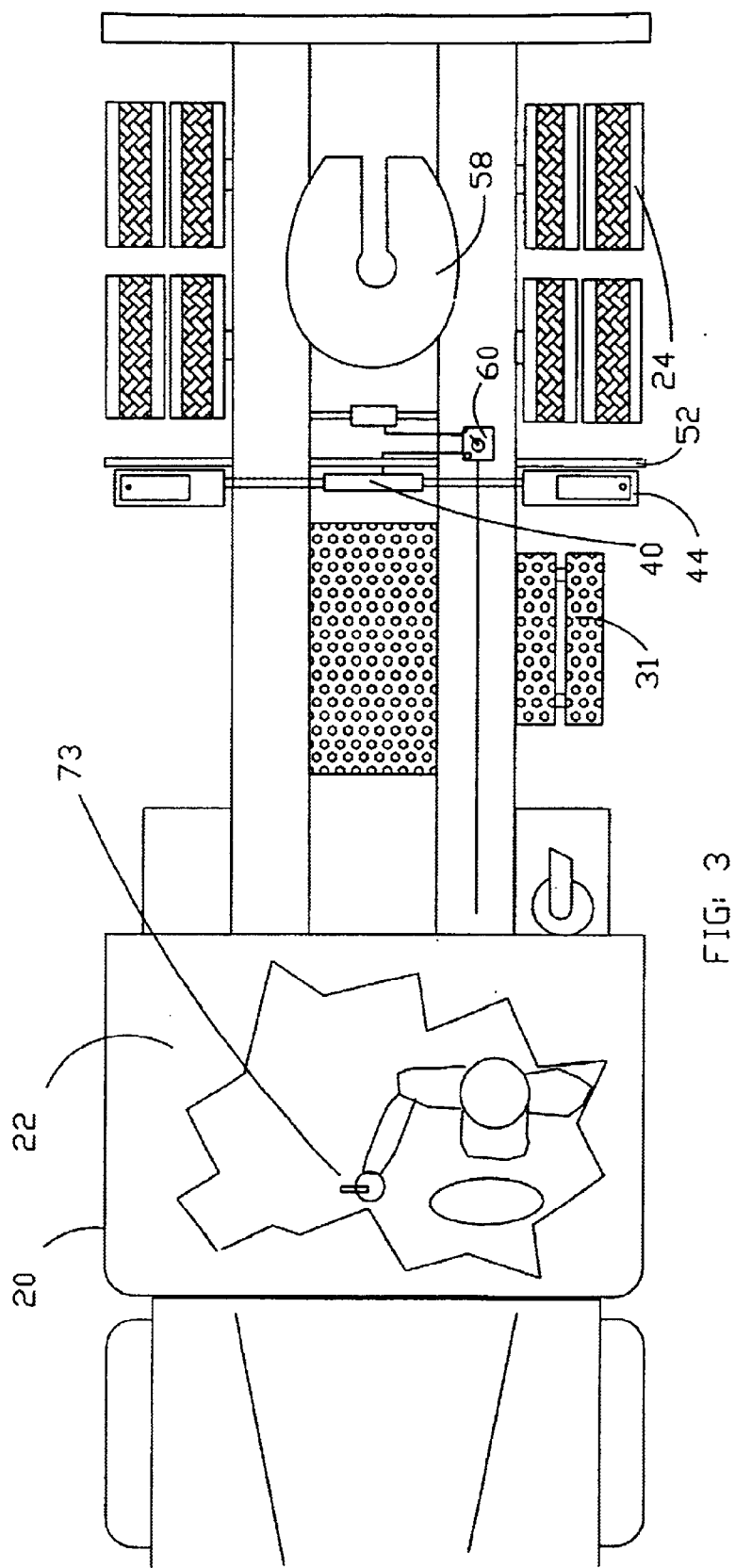
FIG. 3 is a top view, the broken line showing a hidden section.

FIG. 3 shows the whole system as previously defined. One may see a tilting valve 73 in the cabin.

Figure 4:
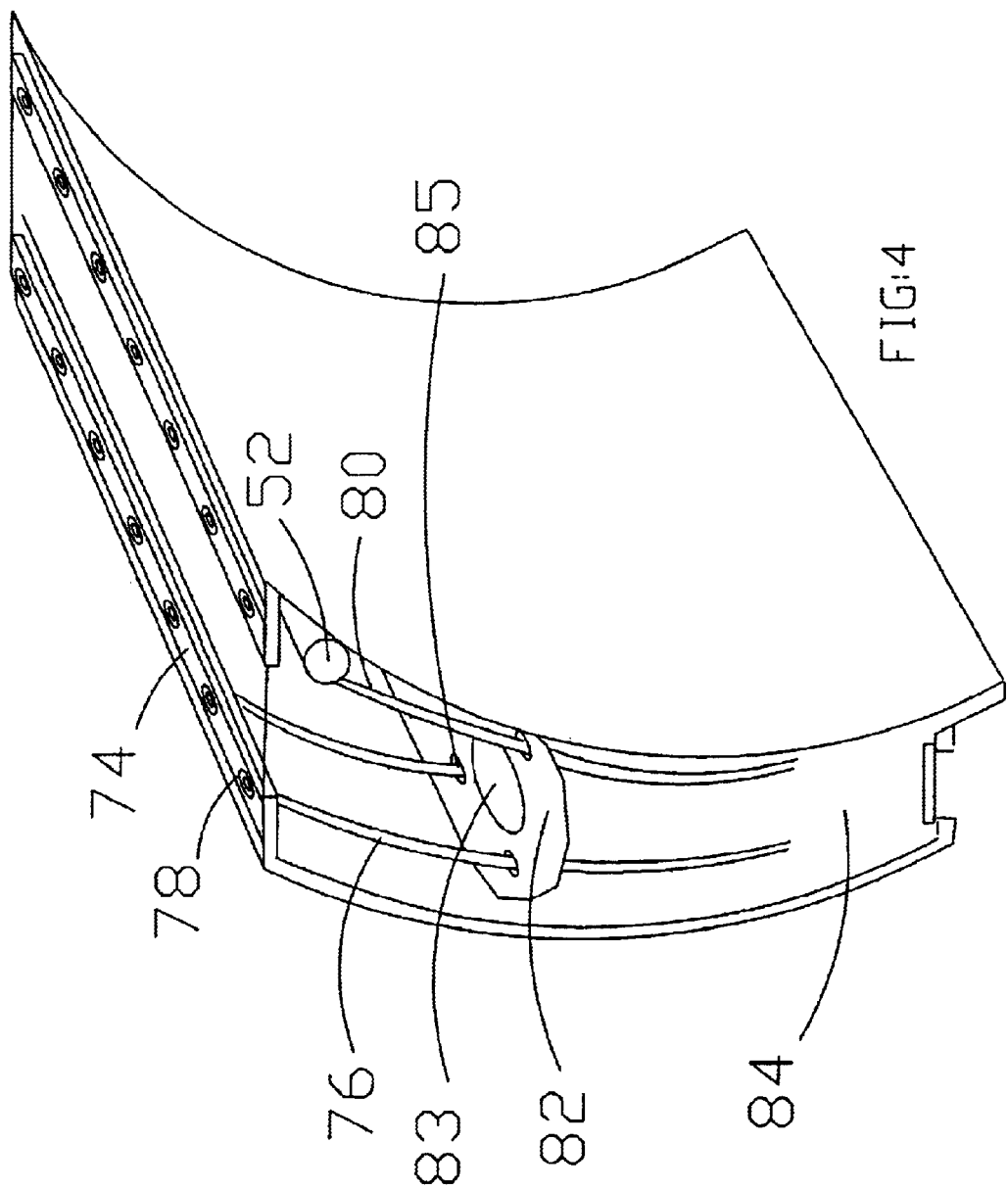
FIG. 4 is an enlarged view of the top with a partial view of the interior.

FIG. 4 shows two support bars 74. The first of these bars supports a number of rods 76, aligned and held by a rod head 78. A second bar supports eccentric rods 80 that run alongside an aileron post 52. A horizontal central support 82 comprises openings 83 allowing passage of gravel 84. An eye 85 receives the rods 76 or the eccentric rods 80.

Figure 5:
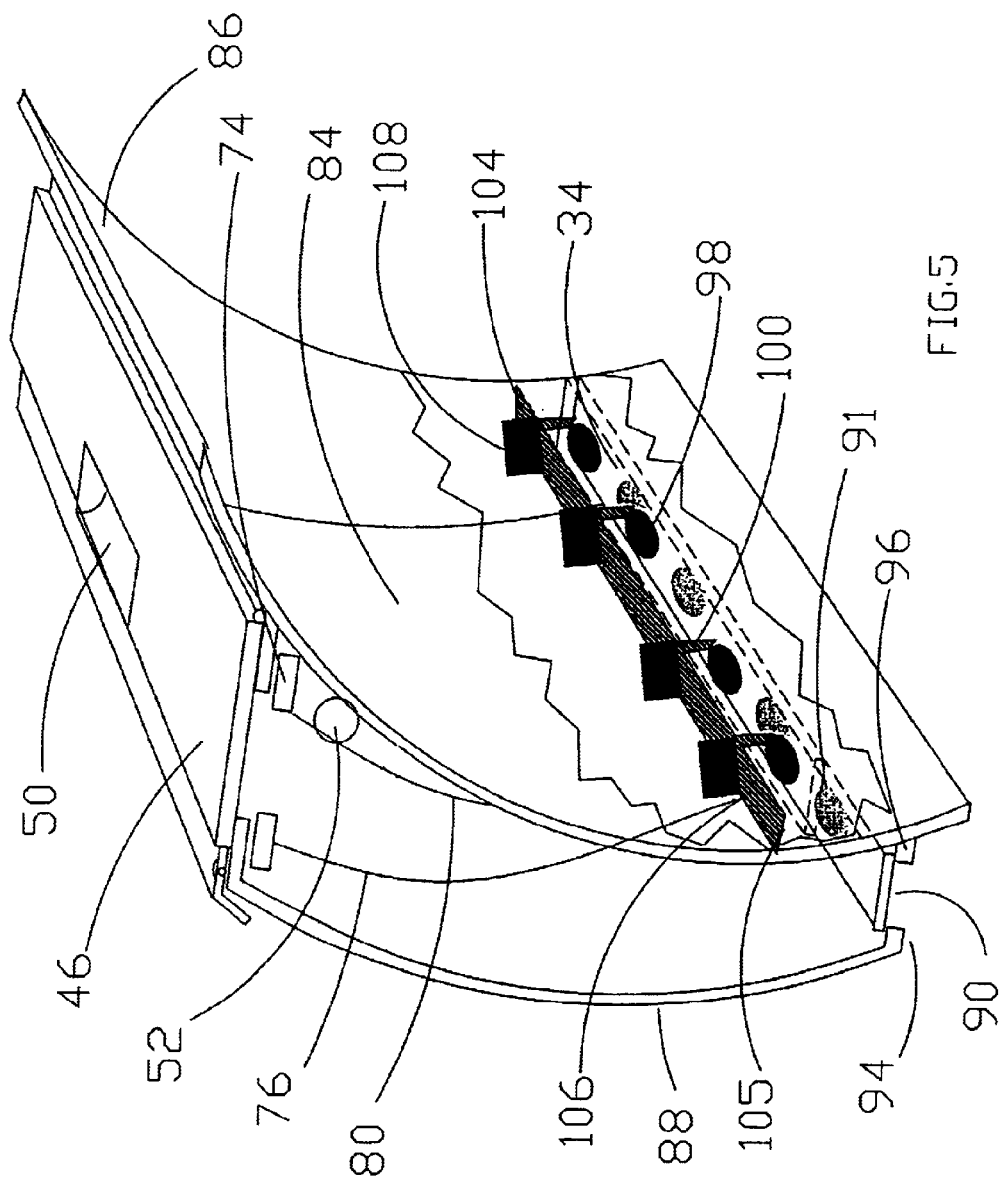
FIG. 5 is an enlarged view of lower part that shows the mechanism.

FIG. 5 shows a concave inner wall 86 partially open. It also displays an outer wall 88 slightly convex. There is a bottom 90, which contains holes 91. There is a heel 94, located at the bottom of the outer wall 88 as well as one inner heel 96. A trap 34, shown in dotted line, has holes 98. A connector 100 connects the trap to a lower support 104, which holds the lower-ends of the rods. This lower support 104 ends by an angle iron 105, part of it shown in dotted line. Rod catches 106 and wings 108 are present on the lower support 104. The lower support 104 is less broad than the trap 34 as the support 104 has wings 108 to deflect gravel when the trap is active.

FIG. 6 shows the gravel bin 32 filled with gravel 84, the rods 76 and eccentric rod 80. There are hinges 48 and the post 52. One can also see the present mudguard in position, as an alternative.

METHOD AND RAMIFICATIONS

When used with a tractor, the method may be used in an emergency to slow down on a slippery road. One only needs to use the tilting valve 73 to release gravel on pavement and tires. It also can be used on a daily basis to increase traction when slowing down, especially in highway access roads or when tying or removing trailers. It will be easier to accelerate speed when gravel is found between tires and road surface. When using a trailer, if a mudguard gritter is in front of the wheels, one need only turn on a second tilting valve 73' when slowing down to avoid skidding. When used with school buses, one tilting valve will also help increase traction or slow down on slippery roads.

It is clearly understood that the mode of realization of this invention which was described above, in reference to the annexed drawings, was given as an indication and are by no means restrictive, and modifications and adaptations can be achieved without the object deviating from the framework of this invention.

Other embodiments are possible and limited only by the scope of the appended claims.

I claim:

1. A bin for use as a mudguard gritter to be installed next to tire wheels and comprising a parallelepiped installed to distribute grit for engaging to said tire wheel, said parallelepiped comprising a wide upper side, a narrow lower side, two vertical end sides and two front and rear face sides; said parallelepiped defining a hopper (44) that can hold a quantity of abrasive substance, said upper side comprising a charging door (46), said lower side comprising a trap door (34) to release said abrasive, the interior of said parallelepiped comprising vertical rods (76) each having a fixed end and a movable end that is connected to the trap door so as to move in a horizontal direction, said vertical rods being positioned for stirring and keeping said abrasive substance in a state such that it can easily fall through said trap door (34) to provide grit to said tire when needed.

2. The bin of claim 1 being able to accommodate between 10 and 100 kg of said abrasive substance, wherein two said end sides are parallel, said front side being concave and said rear side being convex, said bin cross-section with concave and convex sides forming a crescent shape.

3. The bin of claim 1 comprising supports bars (74) installed towards said upper side to support a number of said vertical rods (76), said vertical rods reaching a lower support (104) located close to said lower side.

4. The bin of claim 1 with said lower side comprising bottom holes (91) and said trap door (34) comprising trap holes (98), and wherein a trap rod (36) is activated by a thrust rod (38) powered by an air cylinder for sliding said trap door and said trap holes until said trap holes are aligned with said bottom holes to allow the release of a quantity of said abrasive substance.

5. The bin of claim 3 wherein said trap door (34) comprises rods connecting said trap door to said lower support (104) in a way that said lower support (104) moves in parallel to and at the same time as said trap door (34).

6. The bin of claim 3 wherein said lower support comprises wings (108) to deflect said abrasive substance in its fall towards said openings.

7. The bin of claim 3 with said vertical rods (76) each being held by a rod head (78) in said support bar (74), forming a line of rods facing a line of eccentric rods (80).

8. The bin of claim 7 comprising a central support (82) comprising openings defining two series of rod eyes (85) to hold in place, at a certain distance from one another, said vertical rods (76) and said eccentric rods (80) and said central support moves in accordance with said lower support (104) while said rod head (78) barely moves.

9. The bin of claim 4 mounted on a truck where said air cylinder is activated by a truck air equipment.

10. The bin of claim 4 mounted on a bus where said air cylinder is activated by a bus vacuum system which also operates other bus accessories.

11. The bin of claim 8 having a configuration that fits in a truck.

* * * * *